United States Patent
Cooper et al.

(10) Patent No.: US 10,304,238 B2
(45) Date of Patent: May 28, 2019

(54) GEO-LOCATED ACTIVITY VISUALISATION, EDITING AND SHARING

(71) Applicant: NATIONAL ICT AUSTRALIA LIMITED, Eveleigh, NSW (AU)

(72) Inventors: Chris Cooper, Eveleigh (AU); Bill Simpson-Young, Eveleigh (AU)

(73) Assignee: NATIONAL ICT AUSTRALIA LIMITED, Eveleigh, New South Wales (AU)

(*) Notice: Subject to any disclaimer, the term of this patent is extended or adjusted under 35 U.S.C. 154(b) by 24 days.

(21) Appl. No.: 14/898,008

(22) PCT Filed: Jul. 23, 2014

(86) PCT No.: PCT/AU2014/050143
§ 371 (c)(1),
(2) Date: Dec. 11, 2015

(87) PCT Pub. No.: WO2015/010165
PCT Pub. Date: Jan. 29, 2015

(65) Prior Publication Data
US 2016/0148418 A1    May 26, 2016

(30) Foreign Application Priority Data

Jul. 23, 2013  (AU) .............................. 2013902727
Oct. 18, 2013  (AU) .............................. 2013904026
Jun. 24, 2014  (AU) .............................. 2014902413

(51) Int. Cl.
*G06T 15/20*  (2011.01)
*G06F 17/30*  (2006.01)
*G06T 19/00*  (2011.01)
*G06T 11/60*  (2006.01)
(Continued)

(52) U.S. Cl.
CPC .............. *G06T 15/20* (2013.01); *G06F 16/29* (2019.01); *G06F 16/5866* (2019.01);
(Continued)

(58) Field of Classification Search
CPC ......... G06F 17/30241; G06F 17/30268; G06T 11/60; G06T 19/00; G06T 15/20; H04N 13/0422; H04N 13/0497; H04N 13/0203
See application file for complete search history.

(56) References Cited

U.S. PATENT DOCUMENTS 5,995,903 A    11/1999  Smith et al.
6,040,841 A *   3/2000  Cohen ................... G06T 15/00
                                          345/473

(Continued)

OTHER PUBLICATIONS

PCT International Search Report and the Written Opinion of the International Searching Authority, Australian Patent Office, PCT/AU2014/050143, 7 pages, dated Oct. 3, 2014.

*Primary Examiner* — Samantha (Yuehan) Wang
*Assistant Examiner* — Michael Le

(57) ABSTRACT

This disclosure relates to visualizing geographic positions in a three-dimensional virtual environment. A processor receives position data indicative of a geographic position of an object and generates a first image of the virtual environment which represents a view from an initial observation position in the virtual environment in an initial direction based on an initial target position in the virtual environment. The processor then determines an updated target position that is closer to the virtual position of the object than the initial target position and determining an updated observation position that is closer to a desired observation position than the initial observation position. The processor then generates a second image of the virtual environment which represents a view from the updated observation position in the virtual environment in an updated direction based on the updated target position in the virtual environment.

30 Claims, 11 Drawing Sheets

(51) Int. Cl.
*H04N 13/204* (2018.01)
*H04N 13/324* (2018.01)
*H04N 13/398* (2018.01)
*G06F 16/29* (2019.01)
*G06F 16/58* (2019.01)

(52) U.S. Cl.
CPC .. *G06F 17/30241* (2013.01); *G06F 17/30268* (2013.01); *G06T 11/60* (2013.01); *G06T 19/00* (2013.01); *G06T 19/006* (2013.01); *H04N 13/204* (2018.05); *H04N 13/324* (2018.05); *H04N 13/398* (2018.05)

(56) References Cited

U.S. PATENT DOCUMENTS

| | | | |
|---|---|---|---|
| 6,126,545 A * | 10/2000 | Takahashi | A63F 13/10 345/419 |
| 6,909,429 B2 | 6/2005 | Gottesman et al. | |
| 7,158,878 B2 | 1/2007 | Rasmussen et al. | |
| 2001/0036852 A1 * | 11/2001 | Shigeno | A63F 13/10 463/4 |
| 2001/0049300 A1 * | 12/2001 | Okamoto | A63F 13/10 463/30 |
| 2005/0270311 A1 * | 12/2005 | Rasmussen | G01C 21/32 345/677 |
| 2010/0073363 A1 * | 3/2010 | Densham | G05B 17/02 345/419 |
| 2012/0096374 A1 * | 4/2012 | Leskela | G06F 3/0483 715/764 |
| 2012/0176494 A1 | 7/2012 | Kamon et al. | |
| 2012/0221305 A1 | 8/2012 | Srivastav et al. | |
| 2012/0320169 A1 * | 12/2012 | Bathiche | G06F 3/011 348/53 |
| 2015/0138015 A1 * | 5/2015 | Ishigami | G01C 21/28 342/357.61 |
| 2015/0277548 A1 * | 10/2015 | Imai | G06F 1/1686 345/660 |

* cited by examiner

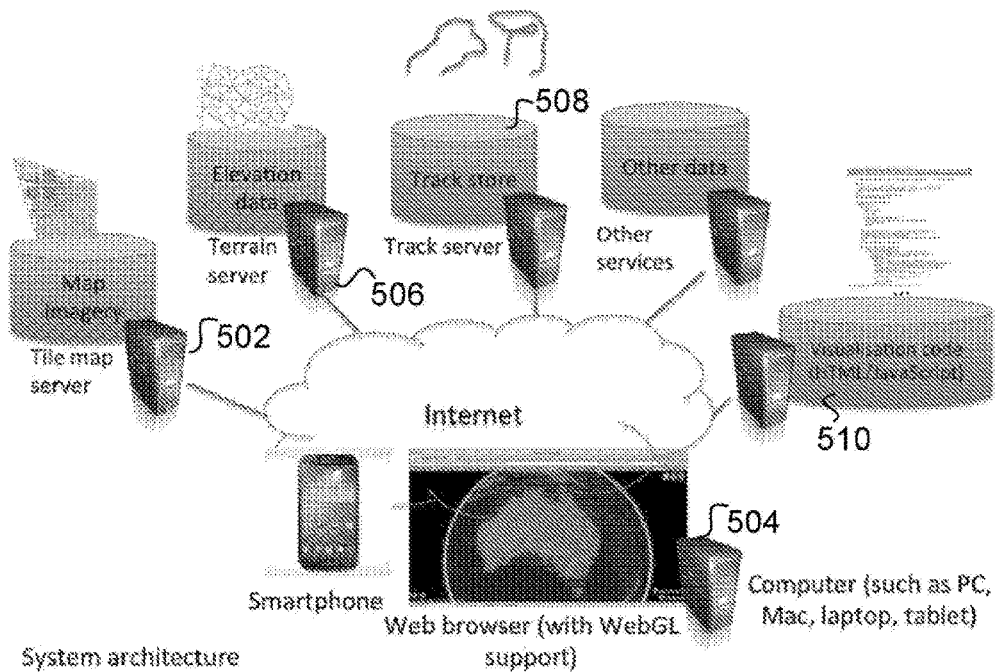

Step 1: Upload a captured GPS track to a remote track store server.

Step 2: In a software viewer, retrieve (i) the GPS track from the track store server; (ii) map tiles from a remote map tile server where these map tiles correspond to the geographical area of the track positions; and (iii) terrain height values from a remote terrain server where these terrain heights correspond to the geographical area of the track positions; and render a time-based 3D visualisation showing an object following the GPS track through a rendered 3D representation of the geographical region.

Step 3: Optionally set parameters for a shared 3D visualisation showing this GPS track including the track position to use for the start of the shared visualisation, the track position to use for the end of the shared visualisation, the theme to use when rendering the shared visualisation and the speed to use when showing the visualisation.

Step 4: On the activation of a "Share" command (eg by pressing a "share" button), save the parameters of the visualisation to share, construct an image representing the shared visualisation (eg a current view of the visualisation to share), save the parameters and representative image on a remote server and use this representative image and a location of the shared visualisation parameters in a social media stream.

Method for sharing a geo-located experience using 3D visualisation and social media

Fig. 6

GEO-LOCATED ACTIVITY VISUALISATION, EDITING AND SHARING

CROSS-REFERENCE TO RELATED APPLICATIONS

The present application claims priority from Australian Provisional Patent Application No 2013902727 filed on 23 Jul. 2013 and Australian Provisional Patent Application No 2013904026 filed on 18 Oct. 2013 and Australian Provisional Patent Application No 2014902413 filed on 24 Jun. 2014 the contents of which are incorporated herein by reference.

TECHNICAL FIELD

This disclosure relates to visualising geographic positions in a three-dimensional virtual environment.

BACKGROUND ART

The concept of a camera or 'third person' observer is used in computer games and virtual environments. The camera is defined by a camera location and a viewing direction. Ideally, the viewing direction is determined such that an object of interest, such an as avatar, is within the view of the camera.

However, objects in virtual environments often move quickly or erratically. As a result, using a view that is fixed on an object or that maintains a fixed distance from the object results in quick and erratic camera movement and therefore a had user experience.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise" or variations such as "comprises" or "comprising", will be understood to imply the inclusion of a stated element, integer or step, or group of elements, integers or steps, but not the exclusion of any other element, integer or step, or group of elements, integers or steps.

DISCLOSURE OF INVENTION

A computer implemented method for visualising a three-dimensional virtual environment comprises:
  receiving position data indicative of a geographic position of an object, the geographic position of the object being associated with a virtual position within the virtual environment;
  generating a first image of the virtual environment which represents a view from an initial observation position in the virtual environment in an initial direction based on an initial target position in the virtual environment;
  determining an updated target position in the virtual environment such that the updated target position is closer to the virtual position of the object than the initial target position;
  determining an updated observation position in the virtual environment such that the updated observation position is closer to a desired observation position than the initial observation position; and
  generating a second image of the virtual environment which represents a view from the updated observation position in the virtual environment in an updated direction based on the updated target position in the virtual environment.

Objects in virtual environments often move quickly or erratically. As a result, using a view that is fixed on an object or that maintains a fixed distance from the object results in quick and erratic camera movement and therefore a bad user experience. In the above method the observation position and the target position are updated so that they are closer to a desired observation position and the object position, respectively. As a result, the camera movement is smoother and a user can see more details during camera movement, which is an advantage over existing methods.

Determining the updated target position and determining the updated observation position may comprise simulating a movement of a physical observer.

Simulating the movement may comprise simulating the movement based on Verlet integration.

Determining the updated observation position may comprise adjusting an azimuth angle to the updated observation position from the virtual position of the object to create a three-dimensional impression between the first image and the second image.

The desired observation position may be based on a desired viewing distance between the updated observation position and the virtual position, of the object.

The desired viewing distance may be based on user input in relation to zooming the image.

The desired observation position may be based on a desired zenith angle to the updated observation position from the virtual position of the object or based on a desired altitude of the desired observation position. The desired zenith angle or desired altitude may be based on terrain data.

The method may further comprise determining the desired zenith angle or desired altitude based on terrain data such that one or more of
  the initial target position,
  the updated target position, and
  the virtual position of the object
are visible from the observation position.

The method may further comprise:
  selecting multiple terrain tiles associated with the virtual environment;
  retrieving the multiple terrain tiles from an terrain tile server;
  storing the multiple terrain tiles in a die cache; and
  determining the terrain data from the multiple terrain tiles.

Selecting multiple terrain tiles may comprise selecting the multiple terrain tiles along a line from the initial or updated observation position to the initial or updated target position.

Selecting multiple terrain tiles may comprise selecting neighbours of selected terrain tiles.

The method may further comprise performing the steps of selecting, retrieving, storing and determining a first time for the updated observation position and a second time for the updated target position.

The method may further comprise repeating the method for a different object.

The method may further comprise:
  receiving from a user a set of customization parameters;
  generating a third image of set of the virtual environment based on the customisation parameters; and
  storing the third image and the customisation parameters on a remote server.

The method may further comprise posting the third image and a reference to the set of customisation parameters to a social media system.

The method may further comprise repeating the method to generate a sequence of images of the virtual environment associated with a first sequence of multiple geographic positions of the object.

The method may further comprise receiving from a user interface a selection of a range of the sequence of images and storing the selection of the range to allow displaying only the selected range of the sequence of images.

The method may further comprise generating a first graphical trace of the object along a first path defined by the first sequence of the multiple geographic positions of the object.

The method may further comprise generating a second graphical trace of a second object along a second path defined by the second sequence of the multiple geographic positions of a second object.

The method may further comprise selecting a third sequence of multiple geographic positions which are co-located and contemporaneous with the first sequence of geo-positions.

Determination of co-location and contemporaneity may be by selecting any sequence of geo-positions for which a first spatiotemporal cube of latitude, longitude and time duration of the first sequence overlaps a second spatiotemporal cube of latitude, longitude and time duration of the third sequence.

The method may further comprise receiving from a user interface a selection of a set of one or more visualisation parameters, wherein generating the second image is based on the set of one or more visualisation parameters.

The method may further comprise receiving from a user interface text data associated with a virtual position, wherein generating the second image may comprise generating the second image such that the second image comprises a label representing the text data located in the virtual environment in relation to the virtual position associated with the text data.

The method may further comprise:
receiving from a user device direction data indicative of a viewing direction of a user; and
determining the updated direction based on the direction data.

The direction data may be indicative of an orientation of the head of the user.

The method may further comprise:
repeating the method to generate a sequence of images of the virtual environment, each image of the sequence being associated with a first geographic position or a first time value; and
displaying in relation to one image of the sequence of images a media item that is associated with a second geographic position or a second time value, such that the first geographic position or first time value associated with the one image of the sequence of images corresponds to the second geographic position or time value associated with the media item.

The method may further comprise:
receiving input data representing a media item; and
retrieving geographic or timing information associated with the media item,
wherein generating the second image comprises generating a display of the media item at a position in the virtual environment which represents the geographic or timing information associated with the media item.

Software when installed on a computer causes the computer to perform the method of any one of the preceding claims.

A computer system for visualising a three-dimensional virtual environment comprises;
an input port to receive position data indicative of a geographic position of an object, the geographic position of the object being associated with a virtual position within the virtual environment; and
a processor
to generate a first image of the virtual environment which represents a view from an initial observation position in the virtual environment in an initial direction based on an initial target position in the virtual environment,
to determine an updated target position in the virtual environment such that the updated target position is closer to the virtual, position of the object than the initial target position,
to determine an updated observation position in the virtual environment such that the updated observation position is closer to a desired observation position than the initial observation position, and
to generate a second image of the virtual environment which represents a view from the updated observation position in the virtual environment in an updated direction based on the updated target position in the virtual environment.

Optional features described of any aspect of method, computer readable medium or computer system, where appropriate, similarly apply to the other aspects also described here.

BRIEF DESCRIPTION OF DRAWINGS

An example will be described with reference to

FIG. 5 shows a system architecture that may be used to implement the method for visualising a three-dimensional virtual environment.

FIG. 6 shows a method for sharing a geo-located experience using 3D visualisation and social media.

BEST MODE FOR CARRYING OUT THE INVENTION

Figure 1:
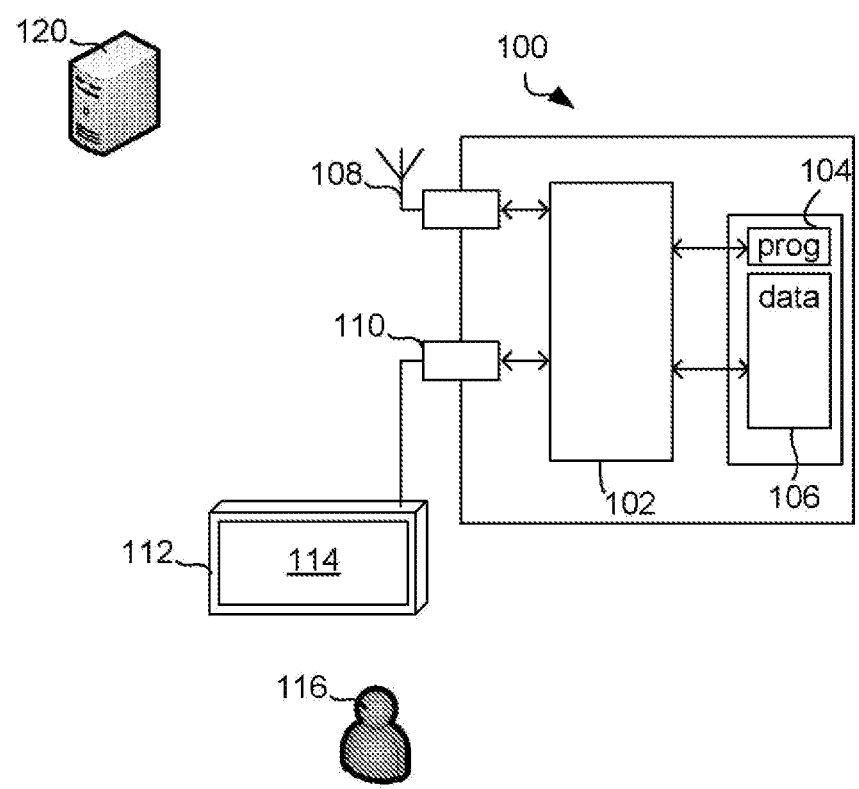
FIG. 1 illustrates a computer system for visualising a three-dimensional virtual environment.

Many mobile devices perform geo-positioning. Such deices include smartphones and tablets with built-in GPS (Global Positioning System) positioning capability such as Apple iPhones®, Apple iPads®, smartphones and tablets with the Android) operating system, personal sports devices such as Nike FuelBand® and vehicle-mounted UPS tracking devices (such as in cars, boats, planes and paragliders). These devices can be configured to record a sequence of GPS positions known as a GPS track. A GPS track can be used to record a sequence of positions that the wearer, holder or vehicle went through during a portion of time. This GPS track can be used as a representation of the journey of the individual or vehicle.

People who use mobile devices with geo-positioning capability can use software applications (such as smartphone apps including Runtastic® and MapMyRun®) for capturing GPS tracks, uploading them to Internet servers and sharing them with friends (for example through programmatic interfaces into Facebook®).

A problem with the current approaches to sharing GPS tracks is that the visualisation of the track is a flat and static representation and it does not capture the excitement of the activity that created the track. Most GPS tracks are created while doing strenuous or exhilarating exercise and/or while viewing scenically beautiful landscapes. These are not captured and communicated effectively by current approaches to sharing GPS tracks. Similarly, an individual who has captured a track cannot control the way in which viewers of the shared UPS track will see the shared track.

The way in which geo-located activities are shared and communicated may be improved to provide an enhanced viewing experience or the viewer of the record of this experience.

A user uses a mobile device (such as a smartphone or UPS tracker) to capture a GPS track. This is typically done for a sporting activity (such as hiking, sailing, running, cycling, climbing, paragliding, driving, etc) but could be done for any activity occurring over a sequence of positions in space. The user uploads the captured UPS track to a server on the Internet (a track store) to view a 3D web-based visualisation of the GPS track rendered in a web browser using remote tile map data and remote terrain data.

The user can search for tracks from other users who were in the same area at either the same time or a different time to include in the visualisation for comparison of position or performance etc.

The user can create a version of the visualisation by editing the appearance theme of the visualisation, changing the start and stop geo-positions at which the version of the visualisation starts and stops, change the speed of the visualisation and add labels associated with geo-positions in the visualisation. The user can then press the "share" button. This generates an image which represents the visualisation of the user's GPS track and a link to data that can be used to generate the new visualisation. A user can post this image and link in a social media stream (such as Facebook) so that their friends can view the visualisation.

FIG. 1 illustrates a computer system 100 for visualising a three-dimensional virtual environment. The computer system 100 comprises a processor 102 connected to a program memory 104, a data memory 106, a communication port 108 and a user port 110, The program memory 104 is a non-transitory computer readable medium, such as a hard, drive, a solid state disk or CD-ROM. Software, that is, an executable program stored on program memory 104 causes the processor 102 to perform the method in FIG. 2, that is processor 102 receives position data, generates a first image, determines updated target and observation positions of a virtual camera and generates a second image using the updated target and observation positions. The term 'determining' refers to calculating a value that is indicative of what is determined. For example, determining an updated target positions refers to calculating a value that is indicative of the updated target position. This also applies to related terms.

The processor 102 may then store the second image on data store 106, such as on RAM or a processor register. Processor 102 may also send the second image via communication port 108 to a server 120 of a social media system, such as Facebook.

The processor 102 may receive data, such as position data from data memory 106 as well as from the communications port 108 and the user port 110, which is connected to a display 112 that shows a visual representation 114 of the virtual environment to a user 116. In one example, the processor 102 receives position data from a tracking device of the user via communications port 108, such as by using a Wi-Fi network according to IEEE 802.11 or USB. The Wi-Fi network may be a decentralised ad-hoc network, such that no dedicated management infrastructure, such as a router, is required or a centralised network with a router or access point managing the network.

Although communications port 108 and user port 110 are shown as distinct entities, it is to be understood that any kind of data port may be used to receive data, such as a network connection, a memory interface, a pin of the chip package of processor 102, or logical ports, such as IP sockets or parameters of functions stored on program memory 104 and executed by processor 102. These parameters may be stored on data memory 106 and may be handled by-value or by-reference, that is, as a pointer, in the source code.

The processor 102 may receive data through all these interfaces, which includes memory access of volatile memory, such as cache or RAM, or non-volatile memory, such as an optical disk-drive, hard disk drive, storage server or cloud storage. The computer system 100 may further be implemented within a cloud computing environment, such as a managed group of interconnected servers hosting a dynamic number of virtual machines.

It is to be understood that any receiving step may be preceded by the processor 102 determining or computing the data that is later received. For example, the processor 102 determines position data, such as by low-pass filtering raw GPS data, and stores the position in data memory 106, such as RAM or a processor register. The processor 102 then requests the position data from the data memory 106, sub as by providing a read signal together with a memory address. The data memory 106 provides the data as a voltage signal on a physical bit line and the processor 102 receives the position data via a memory interface.

Figure 2:
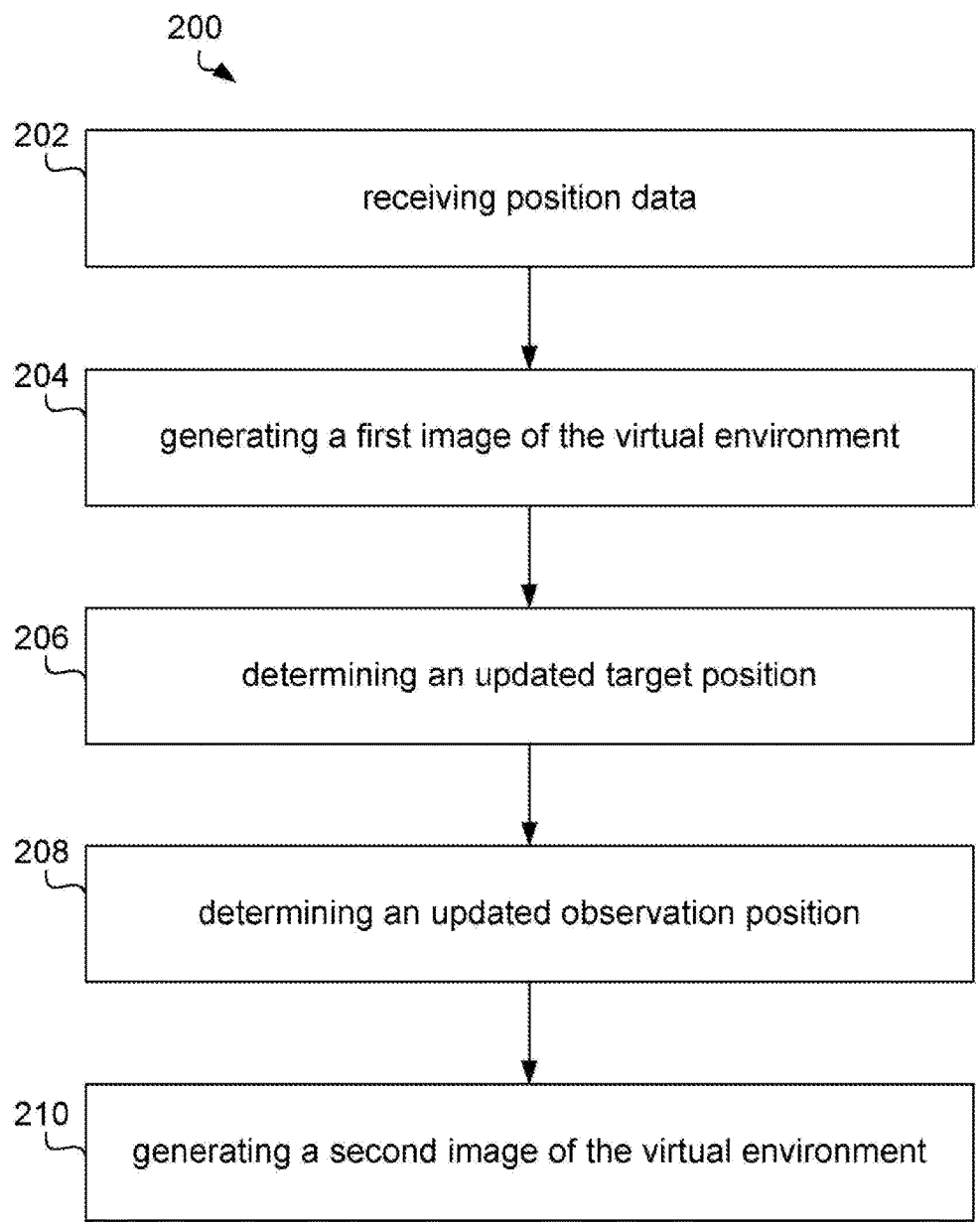
FIG. 2 illustrates a method for visualising a three-dimensional virtual environment.

FIG. 2 illustrates a method 200 as performed by processor 102 for visualising a three-dimensional virtual environment. Processor 102 receives 202 position data indicative of a geographic position of an object, such as data from a global positioning system (CPS) receiver or tracker. In one example, the position data is a file in the UPS eXchange (GPX) format. The GPX file may be an XML file with the following structure:

```
<?xml version="1.0" encoding="UTF-8"?>
<gpx>
    <metadata>
        <time>2014-06-29T22:00:06Z</time>
    </metadata>
    <trk>
        <name>Morning Run</name>
```

-continued

```
<trkseg>
    <trkpt lat="-33.7907100" lon="151.2766320">
        <ele>12.5</ele>
        <time>2014-06-29T22:00:06Z</time>
    </trkpt>
    <trkpt lat="-33.7906230" lon="151.2766440">
        <ele>11.5</ele>
        <time>2014-06-29T22:00:07Z</time>
    </trkpt>
    ...
    </trkseg>
</trk>
</gpx>
```

Each <trkpt> section specifies a latitude 'lat', a longitude 'lon', an elevation 'ele' and a current time 'time'.

The geographic position of the object is associated with a virtual position within the virtual environment such as by a one-to-one mapping. For example, the coordinate system in the virtual environment uses latitude and longitude and altitude as coordinates. The GPX file comprising the geographic positions may be imported into the Cesium software, which is a WebGL virtual globe and map engine and provides functions to convert the latitude, longitude and elevation into Cartesian coordinates, such as Cartesian3.fromDegrees(position.coords.longitude, position.coords.latitude, position.coords.elevation).

Processor 102 then generates 204 a first image of the virtual environment, such as by launching the Cesium environment. The first image represents a view from an initial observation position in the virtual environment in an initial direction based on an initial target position in the virtual environment.

Figure 3:
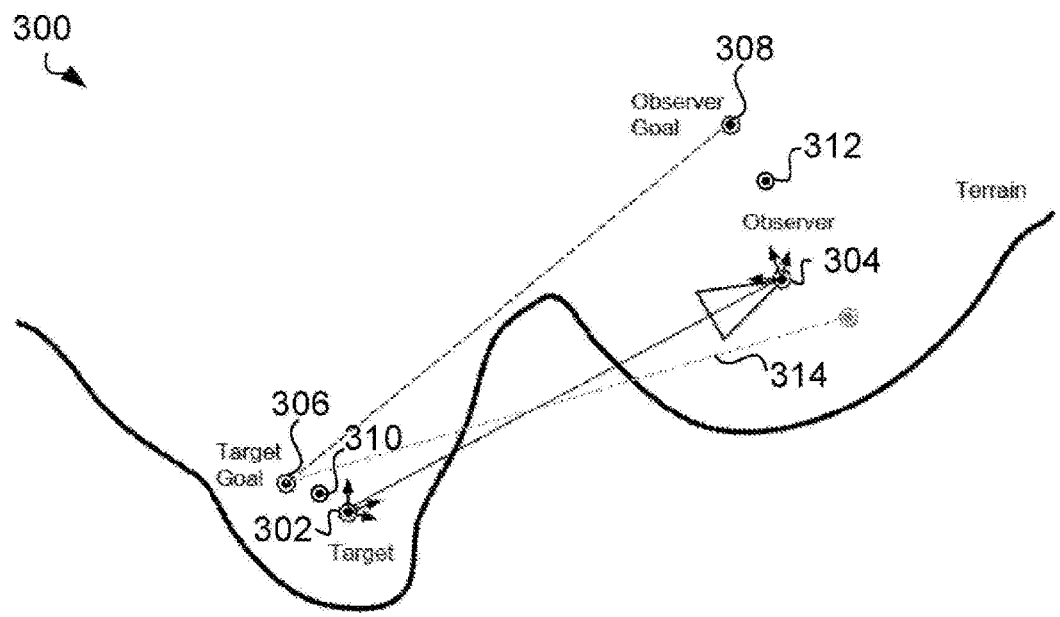
FIG. 3 is an elevation view of a virtual environment.

FIG. 3 is an elevation view of the virtual environment 300 comprising an initial target position 302, an initial observation position 304, a virtual position of an object 306 and a desired observation position 308. All of these positions 302, 304, 306 and 308 are represented by respective position instances. When processor 102 initially launches the Cesium environment, the initial target position 302 and the virtual position of the object 306 have the value of the first geographic position of the GPS track and the initial observation position is at a predetermined distance, azimuth and zenith from the object, such as distance 500 m, azimuth 0 degrees (due north) and zenith 45 degrees. In another example, the initial observation position is at a distance of 500 m from the virtual object 306 and at a height above the virtual object 306 which is calculated by multiplying the distance of 500 in by a constant factor, such as 0.4.

At the launch of the environment, the coordinates are stable and the processor 102 calculates no updates. However, the simulation time progresses as described further below and therefore, the virtual position of the object 306 changes to the next position of GPS track, and the desired observation position 308 changes to a position based on the new virtual position 306. This change is abrupt which would lead to a unsatisfactory user experience.

Therefore, processor 102 determines 206 an updated target position 310 in the virtual environment 300 such that the updated target position 310 is closer to the new virtual position 306 of the object than the initial target position 302, which is the previous virtual position of the object in this example.

Further, processor 102 determines 208 an updated observation position 312 in the virtual environment 300 such that the updated observation position 312 is closer to a desired observation position 308 than the initial observation position 304.

Since the processor 102 adjusts the updated positions towards the desired position the movement is smooth and more appealing to the user than an abrupt movement.

In one example, the desired observation position 308 is based on a desired zenith angle to the updated observation position 312 from the virtual position 306 of the object. The zenith angle is defined as the angle between the horizontal to a line from the virtual position 306 of the object to the desired observation position 308. Processor 102 determines the desired zenith angle based on terrain data, such that the virtual position of the object 306 is visible from the desired observation position 308. For example, processor 102 determines that the line from the virtual position 306 of the object to the desired observation position 308 intersects with the terrain and then increases the zenith angle incrementally until intersection is avoided.

In another example, processor 102 performs a similar method and gradually increases the altitude of desired observation position 308 until intersection is avoided, in yet another example, processor 102 applies trigonometric functions to determine the desired altitude of the desired observation position 308.

Since the camera movement is continually updated it is not important whether the initial target position, the updated target position or the virtual position of the object is visible from the observation position. Therefore, processor 102 may adjust zenith angle or desired altitude to achieve visibility of any one or more of these.

The processor then generates 210 a second image of the virtual environment 300 which represents a view from the updated observation position 312 in the virtual environment 200 in an updated direction based on the updated target position 310 in the virtual environment. Again, the generation of the second image may be performed by the Cesium framework. The method 200 may be repeated such that the subsequently generated images form an animation that can be controlled by user 116 in a similar was as a video clip, that is, the user 116 can play, pause, rewind and watch the camera follow the GPS track in the virtual environment. Additionally, the user 116 may change the playback speed the zoom and other aspects of the visualisation as explained further below.

In one example, processor 102 performs a Verlet integration to determine the updated target position 310 in the virtual environment and the updated observation position 312. The Verlet integration mimics the movement of a physical object, such as a helicopter, and therefore, the movement from the initial to the updated positions is smooth and appears like a natural movement.

The following code uses Cesium convention to implement a Verlet integration when executed by processor 102 performing method 200:

```
CameraController.prototype.integrate = function(pos, vel, dt,
    goal, spring, drag) {
        // momentum p += v * dt
        Cesium.Cartesian3.add(pos,
    Cesium.Cartesian3.multiplyByScalar(vel, dt), pos);
        var delta = Cesium.Cartesian3.subtract(goal, pos);
        // spring
        Cesium.Cartesian3.add(vel,
    Cesium.Cartesian3.multiplyByScalar(delta, dt * spring), vel);
        // drag
```

```
Cesium.Cartesian3.multiplyByScalar(vel, 1.0 - dt * drag,
    vel); };
```

In one example, processor 102 uses the following parameter values:
spring=2
drag=4
dt=0.1
target distance=500
height factor=0.4 (to be multiplied by the target distance)

The above code is called each time the position is updated, that is, once for updating the observer position and Once for updating the target position. As the visualisation continues, for updating the target position the parameter value for 'goal' is replaced by the corresponding geographic location from the GPS track, such that the updated, target position follows the GPS coordinates in the virtual environment.

Similarly, processor 102 determines a desired observer position based on the desired target position, such as a predetermined distance from the target position at a predetermined height/zenith and a predetermined azimuth from the target position. When updating the observer position, the value for 'goal' is replaced by a new desired observer position. Again, this calculation is repeated for each GPS position as the visualisation time proceeds.

In this sense, there a two time scales in the calculations. The first time scale is the visualisation time incremented by 'dt', which has a pre-determined value to guarantee smooth rendering, such as 1/10 s. The second time scale is set by the GPS tracking device and may be 1 s. The visualisation time may start at the earliest time of the UPS track and the desired target position is the first GPS position and the desired observer position is determined based on the first GPS position. In each iteration, the visualisation time is incremented by dt and the observer and target positions are updated using the above code.

This process is repeated until the visualisation time reaches the time associated with the second GPS location. At this point, the desired target position is replaced by the second position of the GPS track and the desired observation position is determined based on the second GPS position. In another example, processor 102 calculates a spline representation of the GPS track to interpolate a smoothened geographical position between recorded GPS positions from the GPX file for each time step dt. Again, the visualisation time is incremented and the positions are updated and so on.

In one example, processor 102 receives from a user device direction data indicative of a viewing direction of a user. Processor 102 can then determine the updated direction based on the direction data.

Figure 4:
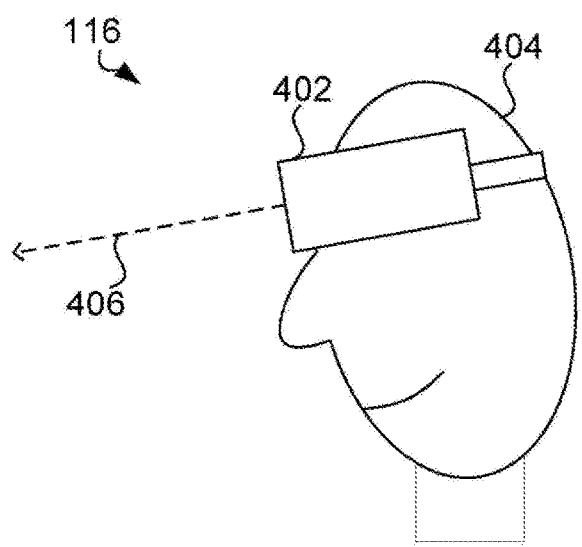
FIG. 4 illustrates user who wears a virtual reality headset.

FIG. 4 illustrates user 116 who wears a virtual reality headset 402 on his head 404. In one example, headset 402 has inertia sensors to measure rotation of the head 404. The rotation of the head 404 is indicative of the orientation of the head 404 as the processor 102 or another processing means in headset 402 can determine the orientation of the head based on the rotation of the head 404.

In this example, the orientation of the head defines a viewing direction 406 of the user, in other examples, the viewing direction is defined by an orientation of a viewing device, such as a tablet computer or a mobile phone. Many current tablet computers and mobile phones have integrated inertial and other sensors that may be used to detect the orientation of the respective device. The viewing direction of the user 114 is then defined by the orientation of the device.

The view direction may comprise three degrees of freedom, such as three angular values roll, pitch and yaw although FIG. 4 only illustrates pitch. Each of these angular values may be defined in relation to a horizontal forward direction.

When processor 102 generates the images such as the second image in step 210 in FIG. 2, processor 102 first determines a direct direction from the updated observer position 312 to the updated target position 310. The processor 102 then applies an additional rotation according to roll, pitch and yaw as provided by the headset 402 to the direct direction to determine the updated viewing direction.

This way, the user 116 can see the virtual environment as seen from a helicopter following the object through the virtual environment, while at the same time looking in different directions to inspect the surroundings of the virtual environment. For example the GPS data is a track of a paraglider flying over a cliff and the observer, that is the observation position, is following a paraglider over the cliff. User 116 can then look downwards and the second image of the virtual environment visualises the cliff as seen from above.

In one example, the observer path is spherical rather than elliptical with a radius representing a desired viewing distance between the updated observation position and the virtual position of the object. This may be implemented by trying to maintain a desired camera-to-target distance based on the user defined zoom level using controls 718 and 720 in FIG. 7*a*.

The Doarama approach thresholds the ray sampling to the maximum of 50 m and 0.1 times target distance to avoid sampling too close to the target when zoomed in close. It will also skip samples a long way away from the target as a by-product of the caching mechanism. Parameters for threshold and caching have been tuned to improve the Doarama user experience. Terrain tiles are stored in a quad-tree that allows zooming in and out. In one example, processor uses terrain tile level 11 of the quad tree to perform terrain sampling. This relatively coarse tile level provides sufficient accuracy while reducing the number of tiles to be loaded. This terrain tile level may remain constant when the user 116 zooms. In one example, the described methods avoid using a time step based on device playback rate altogether since it may be prone to instability. The camera controller smooths a target location of the camera. In one example, the methods use the same smoothing to transition between which target/agent is selected providing a smooth seamless user experience.

The camera may modify the distance between camera and target to provide a zoom effect. The camera controller is adding extra functionality on top of the standard Cesium Virtual Globe camera which already provides for zoom. The Doarama camera detects when the standard Cesium camera is zooming then disables camera inertia as well as updating the desired camera-to-target distance.

When a virtual environment stands still, it is often perceived as flat, or 2D. To maintain a 3D perception even in cases where the object stands still or the playback is paused, the camera incorporates a behaviour that makes the camera slowly rotate around the target. This is to mimic real world helicopters which often do this when filming a subject at ground level. This keeps the 3D view visually 'alive' even when the target/agent is stationary. In other words, processor 102 adjusts an azimuth angle to the observation position from the virtual position of the object to create a three-dimensional impression between the first image and the second image.

Since the camera leverages the Cesium camera, it can also take advantage of touch controls if a device supports it. This includes pinch zoom, swipe to rotate etc.

In one example, processor 102 provides a terrain caching system for use with the camera controller. This helps facilitate fast point sampling of terrain elevation along the line of sight. Processor 102 discretely sample along the dotted line 314 in FIG. 4. For each discrete point processor 102 determines the terrain elevation at that point to determine whether to push 'observer goal' up.

Terrain is served in a tiled form from a 3rd party server (like the map imagery), such as Analytical Graphics Inc.'s STK Terrain Server. Processor 102 requests the tiles, such as by calling a requestTileGeometry function of Cesium. Terrain data for a single tile is represented as a heightmap. A heightmap is a rectangular array of heights in row major order from south to north and west to east. Processor 102 can access the heightmap to determine the height of any position. Processor 120 keeps a number of terrain tiles locally on the data memory 106 for sampling. Such a cache can do fast local terrain queries on dynamic moving objects.

For a query point (latitude,longitude) processor 102
    determines terrain tile coordinates for the latitude/longitude of the query point.
    adds that terrain tile to a request list
    adds all neighbours of that terrain tile to the request list.
    keeps at least the 3×3 grid of terrain tiles in the cache lie central tile+all neighbours).

This can hide latency when the dynamic query location moves between tile boundaries.
    The actual elevation query then involves making sure the appropriate terrain tile is in the cache and doing a terrain lookup on that tile (using Cesium code for this step).

Processor 102 maintains two of these caches, one each for target and observer locations. In some examples, it is sufficient to consider only the terrain tile under the target and under the observer to determine whether the object is occluded. Processor 102 may download neighbouring tiles to allow movement of target in any direction and to avoid stalls while waiting for a terrain tile to load. The results is be a 3×3 grid below each of camera and observer in FIG. 3.

In another example, processor 102 selects multiple terrain tiles to be requested along a line from the initial 302 or updated 310 observation position to the initial 304 or updated 312 target position to determine an intersection of the terrain with the line of sight that would occlude the object.

FIG. 5 shows a system architecture 500 that may be used to implement method 200. Architecture 500 comprises computer 502 acting as a tile map server, serving up tiles of imagery representing particular geographical locations to a client computer 504 (eg a client computer running a web browser) at different resolutions depending on the resolutions required by a viewer. For example, at a distance, low resolution images may be served and for close-up views high resolution images may be served.

Typically the tile map server 502 serves imagery captured by a satellite but it may serve up other forms of imagery including street maps and computer-generated imagery.

The system also includes a terrain server 506. The terrain server may be running on the same computer hardware as the tile map server 502 or different hardware. It serves height information corresponding to particular geographical positions.

The system also includes a track store 508. This typically consists of a database (such as an SQL database, a NoSQL database or a flat file store) which stores GPS tracks and associated information and software that serves this GPS. This GPS track data is typically served by a web server on request to clients running web browsers, Associated with the GPS track is the ID of the user who has uploaded, it to the server and information about visualisations that can be generated using the GPS track including parameters that will be used to control the visual appearance when this is presented.

The system also includes a web server 510 running on a computer that serves HTML and JavaScript code which performs 3D visualisation of GPS tracks and this is typically served using the HTTP protocol or similar protocol. This web server may be the same web server 508 that serves the track store data or may be a different web server. It may be on the same computer or a different computer.

The system also includes devices 504 that can be used to provide 3D visualisation of GPS track data. This is typically a computer limning a web browser (typically supporting the WebGL standard developed by the Khronos Group), a tablet or a smartphone but it may be other devices which include a display.

FIG. 6 shows a method 600 for sharing a geo-located experience using 3D visualisation and social media. The method includes the following steps.

The user uploads a captured GPS track to a remote track store server 508. This may be done after the GPS track has been captured or done while the GPS track is being captured. As well as GPS tracks, any other time-ordered sequence of geo-positions can be used.

When a GPS track is uploaded, the track server 508 determines the spatiotemporal extent of the activity using a three-dimensional (latitude, longitude, time) hounding box and stores this in the track store. The track server 508 determines whether this bounding box overlaps with any other bounding boxes stored in the track store. If any stored tracks overlap existing ones, the user is given the option of including any or all of these tracks in their visualization. Track server may use other algorithms for selecting tracks to include in the visualization. For example, using a four-dimensional hounding box (latitude, longitude, height, tune), two-dimensional bounding box (latitude, longitude) or spatial similarity in the sequence of geo-positions (e.g. where two cyclists have cycled down the same road).

In a software viewer, retrieve (i) the GPS track from the track store server 508; (ii) map tiles from a remote map tile server 502 where these map riles correspond to the geographical area of the track positions; and (iii) terrain height values from a remote terrain server 506 where these terrain heights correspond to the geographical area of the track positions; and render a time-based 3D visualisation showing an object following the GPS track through a rendered 3D representation of the geographical region.

Figure 7A:
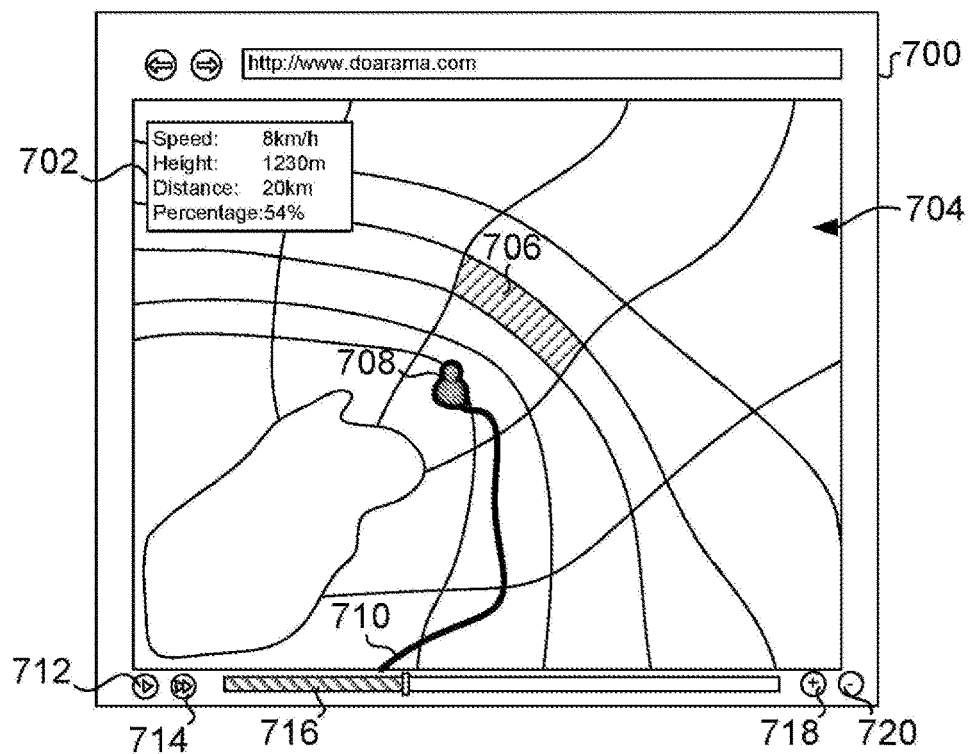
FIG. 7*a* shows an example screen shot of a software viewer (such as a web browser).

FIG. 7a shows an example screen 700 of the software viewer (such as a web browser) In this example, user 116 records a GPS track while walking around a lake in the mountains. Screen 700 comprises an information panel 702 that shows information about the activity represented by the GPS track, such as current speed, altitude/height, distance travelled so far, proportion of the distance travelled. etc. Screen 700 further comprises a rendering of imagery from remote tile, map wryer 502 combined with height information from terrain server 506. FIG. 7a shows an example tile 706 where the shading represents the imagery of that tile.

Screen 700 also comprises an icon 708 representing an individual or vehicle with GPS tracker. The icon may be retrieved from a remote avatar server, such as gravatar.com. Also shown is a graphical trace 710 that represents the GPS track.

Screen 700 further comprises user controls for decreasing the playback speed 712, increasing the playback speed 714, a time indicator that is interactive for setting displayed time offset and controls to zoom in 718 and to zoom out 720.

Figure 7B:
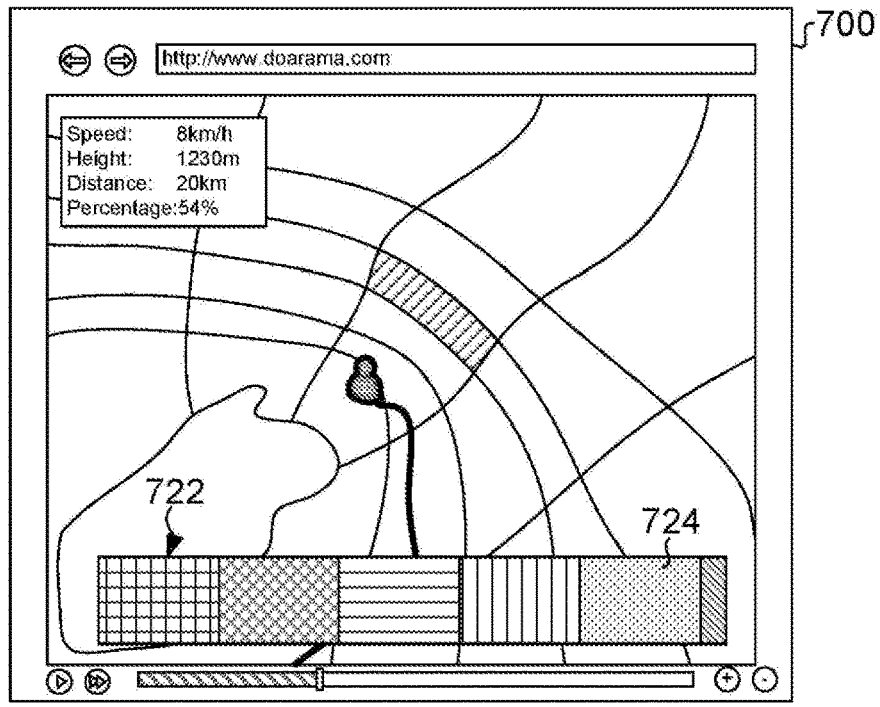
FIG. 7*b*-7*f* show example screen shots of a web browser showing setting of parameters.

FIG. 7b illustrates screen 700 now comprising a theme selector 722. User 116 can select one of the themes shown in theme selector 722 to select a set of one or more visualisation parameters, such as colour balance, brightness, saturation and other effects. In this example, user 116 selects example set 724 of visualisation parameters.

Figure 7C:
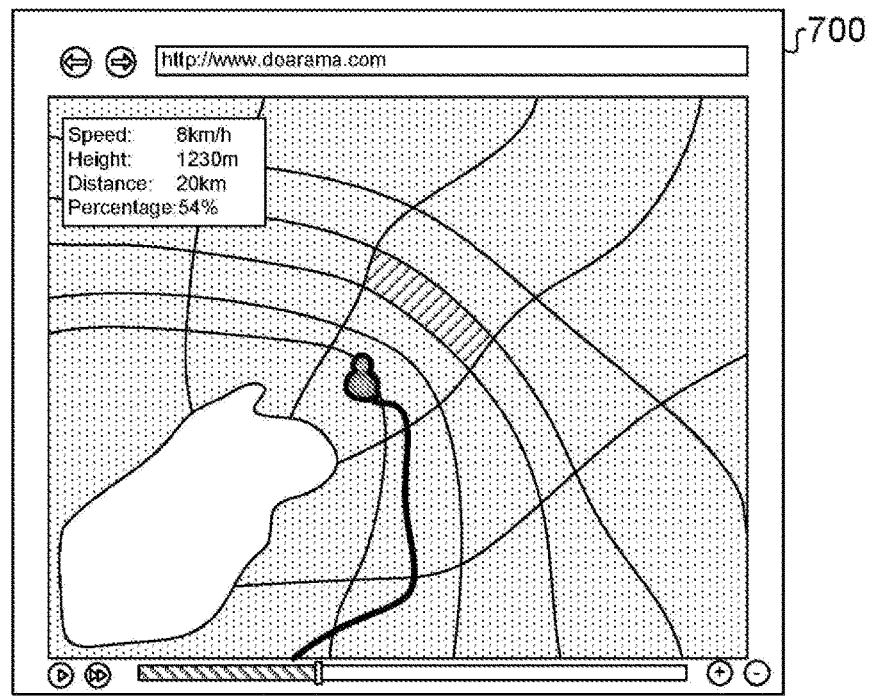

FIG. 7c illustrates screen 700 after the visualisation parameters are applied. It can be seen that the shading across the screen has been adjusted.

Figure 7D:
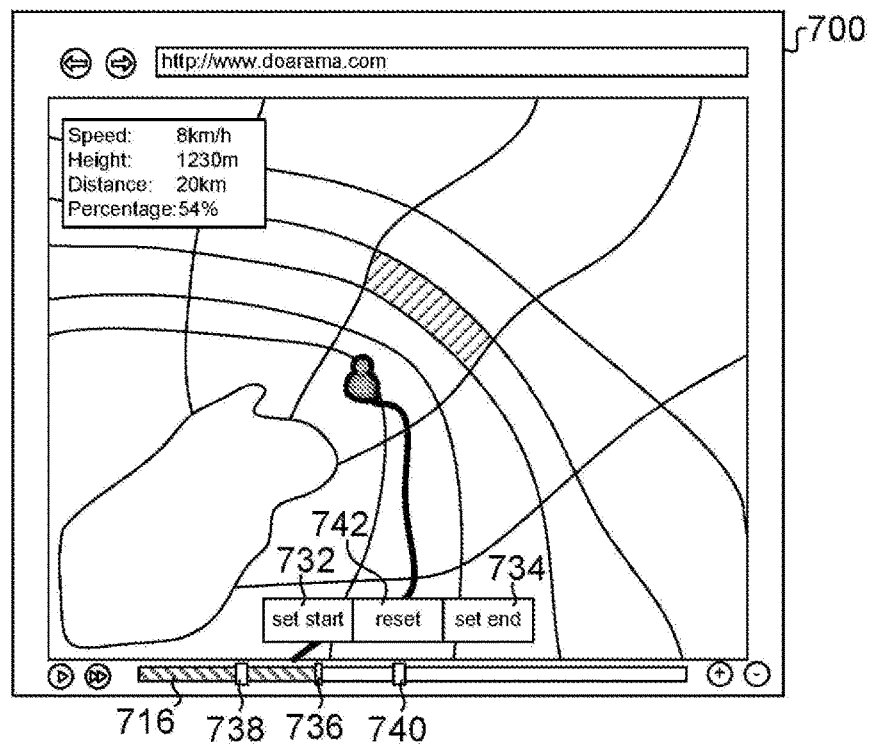

FIG. 7d illustrates screen 700 now comprising user controls for setting a start 732 and the end 734 of the playback to be shared. User 116 moves a current playback time indicator 736 to a suitable point in time, such as the beginning of the walk, and clicks on the start control 732. As a result, a playback start indicator 738 appears on timeline 716. Similarly, user moves the indicator 736 to another point in time such as the arrival at a particular location, and clicks on the end control 734. As a result, a playback end indicator 740 appears on timeline 716. User 116 may also click on a reset control 742 to delete the starting point and end point and as a result, the entire OPS track will be shared.

Figure 7E:
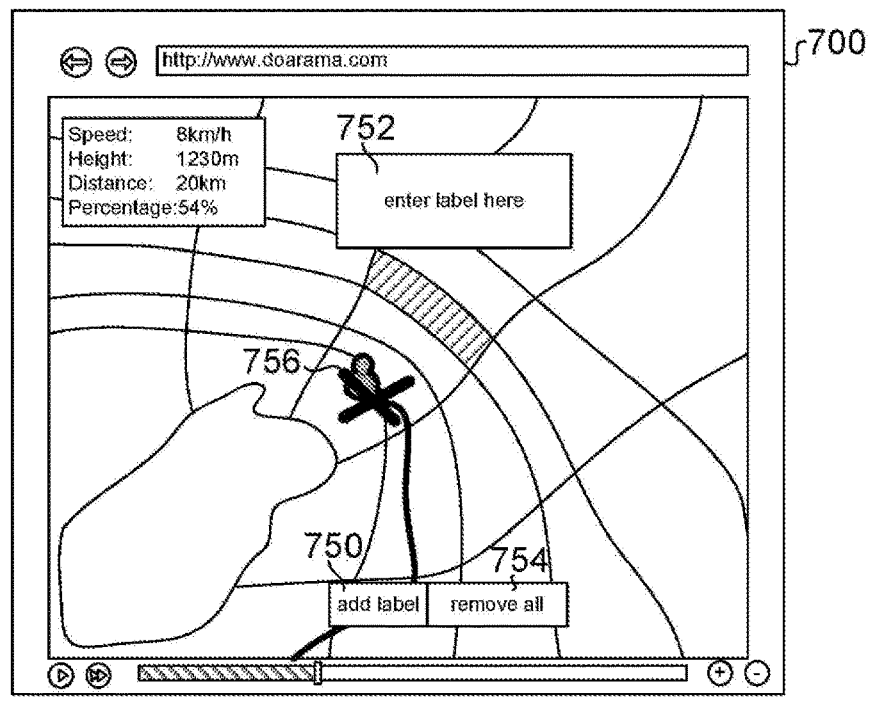

FIG. 7e illustrates screen 700 now comprising an add label control 750. When user 116 clicks on this control 750, an text input form 752 is generated and, user 116 enters a label. User 116 may also remove all labels by clicking on the corresponding control 754, Processor 102 receives the label text entered by user 116 and stores this text associated with a GPS position 756 corresponding to the current playback position.

Figure 7F:
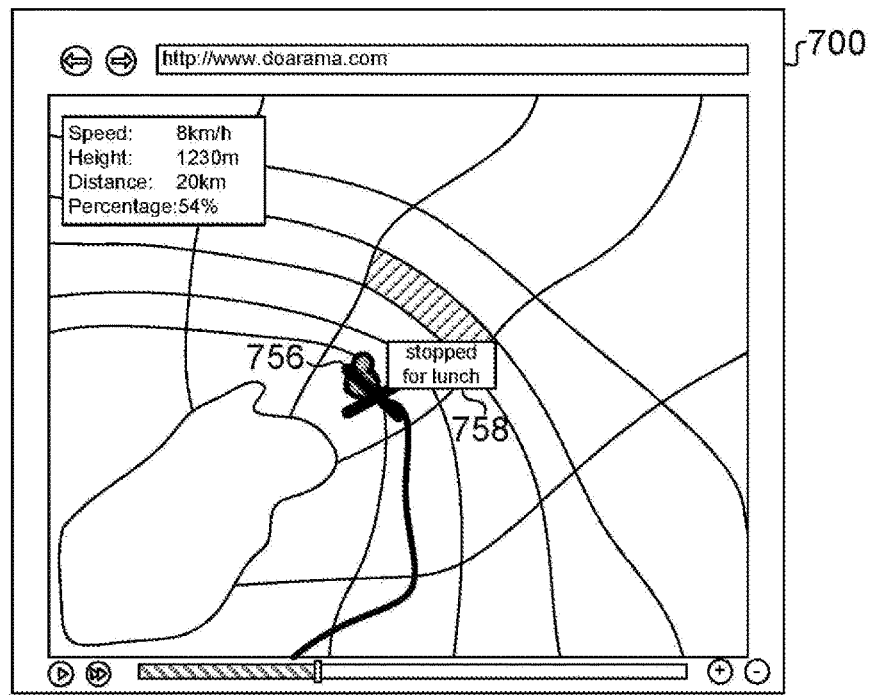

FIG. 7f illustrates screen 700 now comprising the label text 758 located at the position 756 within the three-dimensional virtual environment that corresponds to the GPS position at the current playback time where. the label was added by user 116 in FIG. 7e.

Optionally set parameters for a shared 3D visualisation showing this GPS track including the track position to use for the start of the shared visualisation, the track position to use for the end of the shared visualisation, the theme to use when rendering the shared visualisation and the speed to use when showing the visualisation.

Figure 7G:
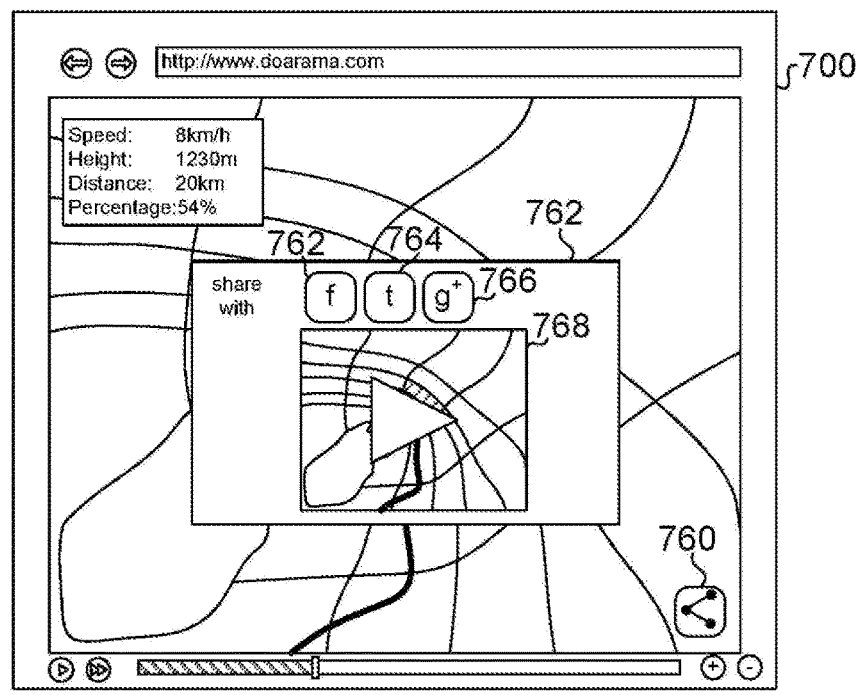
FIG. 7*g* shows an example screen shot of a web browser running 3D visualisation of geo-located activity.

FIG. 7g illustrates screen 700 now comprising a share control 760. When the user 116 clicks on the share control 760, a confirmation interface 762 is generated. The confirmation interface 762 comprises three options 762, 764 and 766 for service providers of social media or social network platforms. Confirmation interface 762 further comprises a preview image 768 that will appear on the selected social media platform.

On the activation of one of the "Share" command (eg by pressing a "share" button) 760, 762, 764 or 766, processor 102 saves the parameters of the visualisation to share, constructs the preview image 768 representing the shared visualisation Keg a current view of the visualisation to share), saves the parameters and representative image on a remote server and uses this representative image and a location of the shared visualisation parameters in a social media stream.

In the example of FIG. 7g of a web browser running 3D visualisation of geo-located activity, when a user selects a social media system (eg Facebook®, Twitter®, Google+® etc, the web browser is directed to the relevant social media platform and a page shown for that platform.

Figure 8:
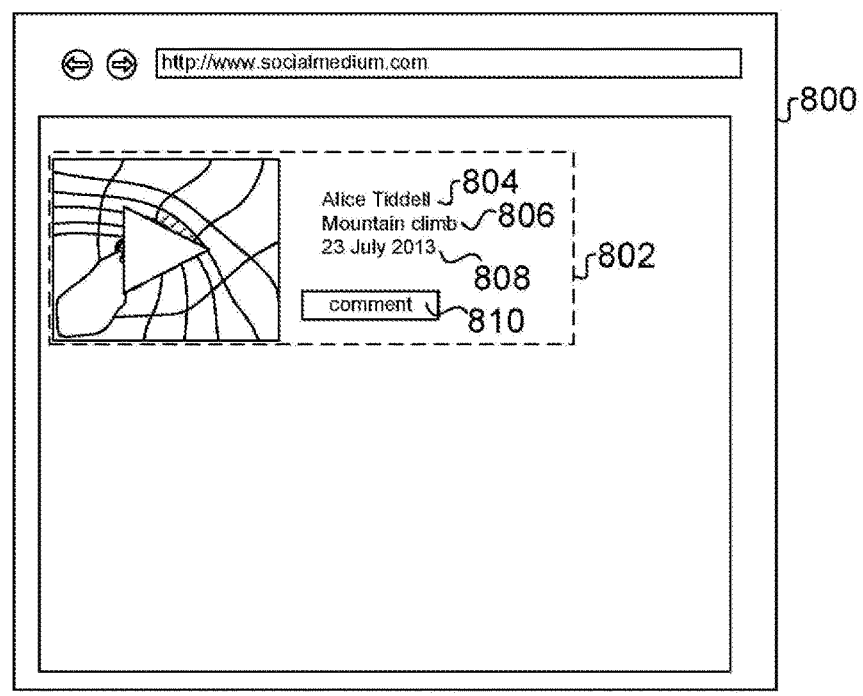
FIG. 8 shows a page provided by a social media system.

For example FIG. 8 shows a page 800 provided by Facebook allowing editing of descriptive information to associate with the visualisation. The user can provide this information and the image would be posted to the user's page on the social media platform (such as then Facebook® news feed 802) associated with user information, such as name 804, activity description and activity date 806 and a comment control 810 that allows other users to participate and comment on the posted activity. Typically the representative image would be a link which, when pressed generates a visualisation corresponding to the parameters set by the user.

Figure 9:
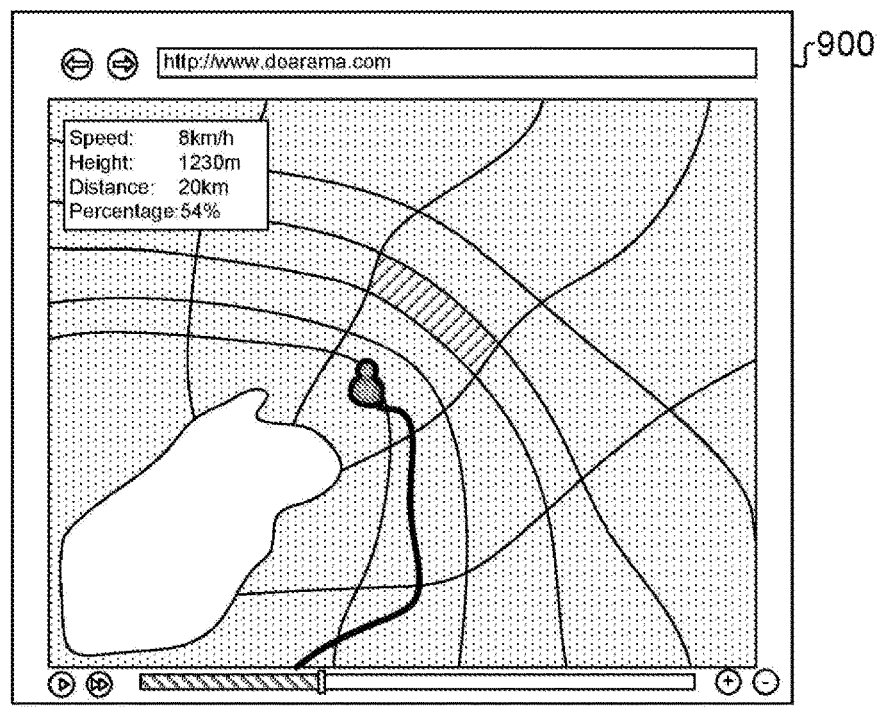
FIG. 9 shows an example of a generated visualisation.

FIG. 9 shows an example of a generated visualisation 900 produced when the link associated with the representative image is pressed in the social media platform. As can be seen, the visualisation is configured according to the selected set of visualisation parameters as described with reference to FIGS. 7b and 7c.

Figure 10:
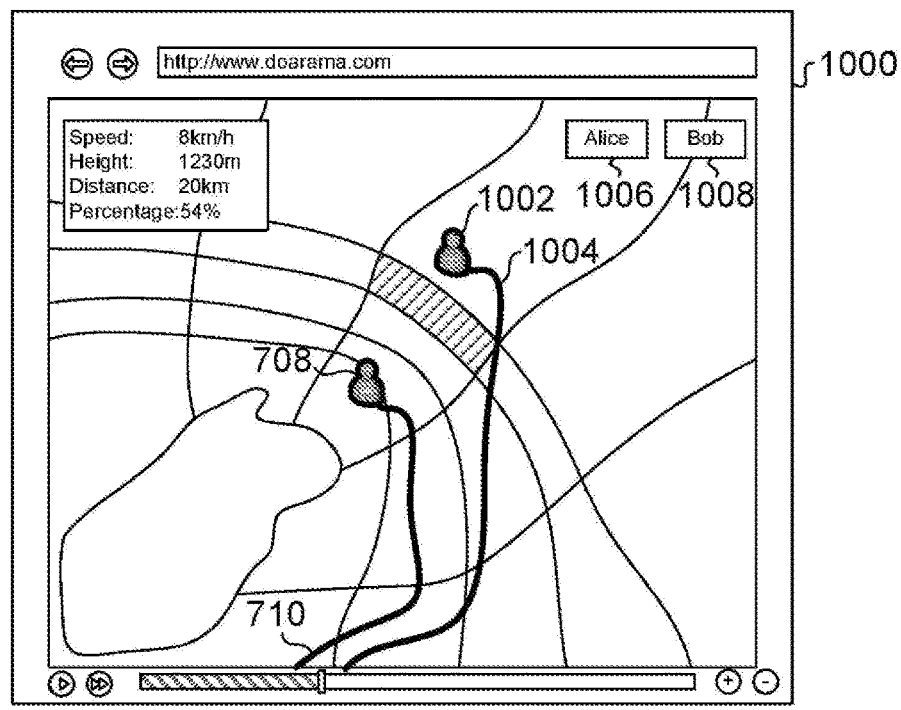
FIG. 10 shows a multi-trace screen.

FIG. 10 illustrates a multi-trace screen 1000 comprising the first icon 708 and the first trace 710 from FIG. 7a and further comprising a second icon 1002 and a second trace 1004. The multi-trace screen 1000 further comprises a first control 1006 to select the first trace 710 and a second control 1008 to select the second trace.

In one example, when user 116 uploads a new GPS track, processor 102 determines the extreme coordinates of the GPS track. For example, processor 102 determines the maximum latitude, minimum latitude, maximum longitude and minimum longitude. Each of these four values define a geographical line and all four lines together define a rectangle that represents the geographical limits of the activity corresponding to the uploaded GPS track. When the same user 116 or a different user uploads a further GPS track, processor 102 determines whether any of the geographical positions of the further GPS track lies within any rectangle of any existing UPS tracks, that is. whether the further GPS track is co-located to an existing UPS track. In other words, in examples where many UPS tracks are already stored, processor 102 selects one or more of the stored UPS tracks such that at least one geographical position of the further GPS track lies within the rectangles of the selected one or more stored GPS tracks. Processor 102 then stores an association between the selected tracks, such that associated tracks are displayed as traces in the virtual environment, such as first trace 710 and second trace 1004.

In another example, processor 102 also considers the time stamps of the geographical positions of stored UPS tracks, such that the processor 102 stores an association when at least one time stamp of the further GPS track lies between the earliest time stamp and the latest time stamp of a stored UPS track that is the further GPS track is cotemporaneous to the stored UPS tracks. Processor 102 may select co-located or cotemporaneous tracks or tracks that are both co-located and cotemporaneous.

If the user selects to view collocated and contemporaneous tracks, these are also shown in the visualization. While the visualization is being animated, a user can choose to select to follow any of the tracks, such as by clicking on controls 1006 and 1008. Choosing to follow a track leads to the focus of the virtual camera following the chosen track as described above with reference to method 200 in FIG. 2. For example, the virtual camera follows track 710 with virtual position 708 of the object and then, the user 116 changes to track 1004. As a result, the virtual object position changes to position 1002 and the processor 102 determines an updated target position and an updated observation position based on the changed virtual object position 1002 as described with reference to FIG. 2. As a result, changing between traces 710 and 1004 is a smooth transition similar to the camera following object 708 and gives the user 116 the impression that the camera is flying like a helicopter towards object position 1002.

In one example, a mobile device carried by user 116, such as a smartphone, can add metadata to a photo including the location and time where it was taken, which is referred to as geotagging. User 116 may conduct an outdoor activity and records a trace of the location (e.g. derived from GPS, accelerometer/gyro etc) along with photos, or single or multiple streams of video from an action camera. These may be recorded by separate devices, such as dedicated GPS+ GoPro action camera, or from a camera that can capture both location track and video stream simultaneously, such as Garmin VIRB Elite HD Action Camera or Contour+ 2.

Support for richer media, such as videos and photos will be described, in a similar way to the previous 'labels' feature.

An example implementation leverages third party application programming interfaces (APIs) to provide access to photos and videos stored on third party servers. The API may be an Instagram API, YouTube API or others.

Throughout this disclosure, media refers to all of video, photo and text comment support.

Processor 102 may generate a 'picture-in-picture' user experience to simultaneously display an animating map in one view synchronised with either photos or video in another view. The user 116 viewing the shared experience may have the option to decide what they want in the main view versus the smaller picture-in-picture display(s). This viewing experience may be supplemented with split screens or other viewing configurations.

Figure 11:
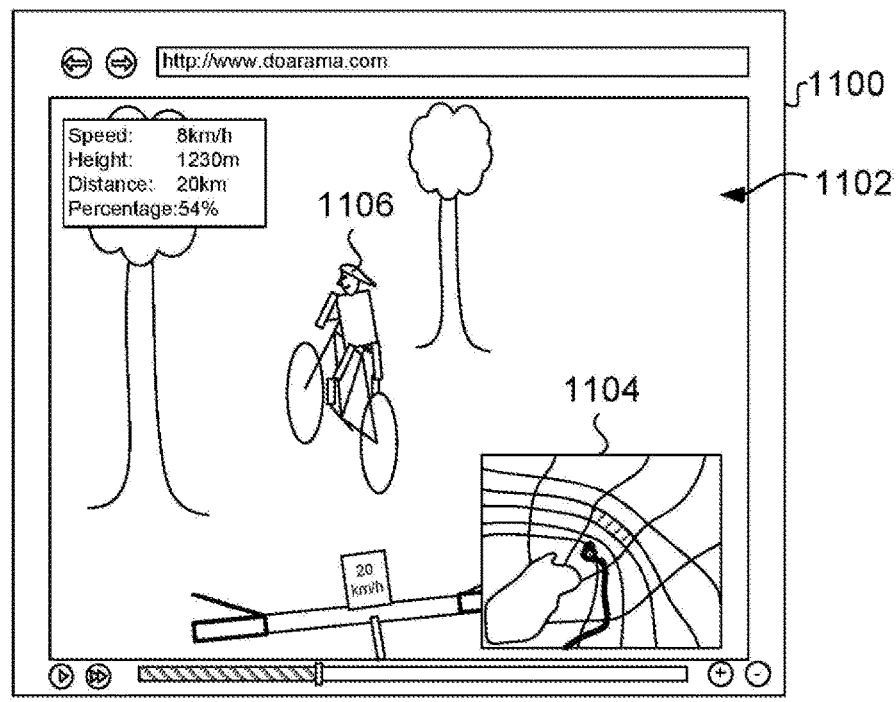
FIG. 11 shows an example of a picture-in-picture screen.

FIG. 11 illustrates a picture-in-picture screen 1100 comprising a video display 1102 and a visualisation of the virtual environment 1004. In this example, user 116 has captured the video while riding behind another mountain biker 1106. Associated with the video is metadata including timing information and processor 102 displays the video and the GPS track in the virtual environment 1004, such that the currently displayed video frame 1102 corresponds to the current geographic position in the virtual environment 1104.

Figure 12:
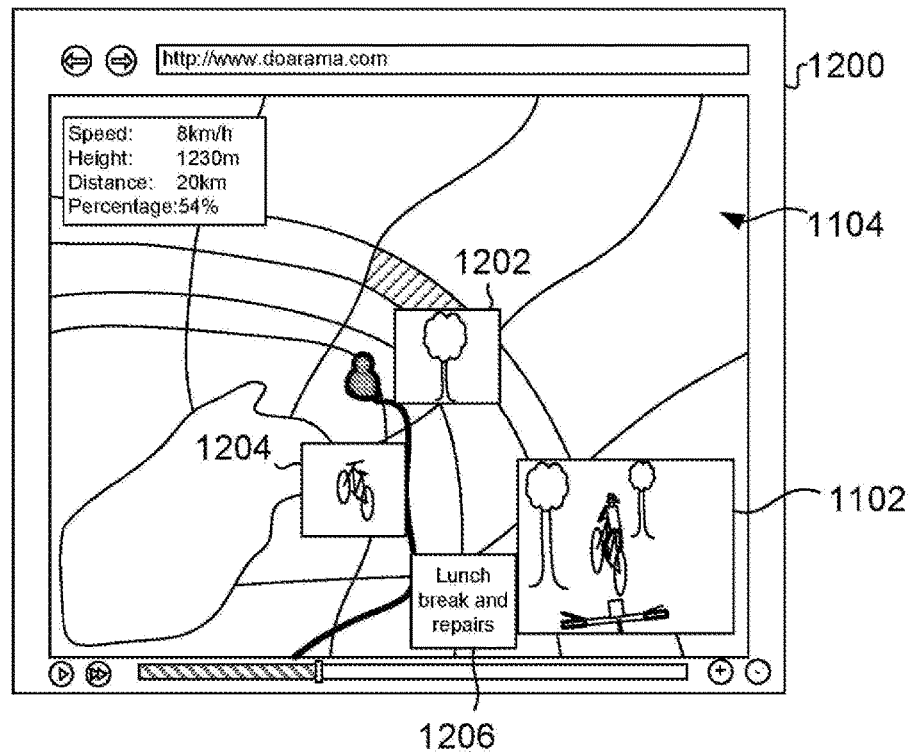
FIG. 12 shows another example of a picture-in-picture screen.

FIG. 12 shows another example of a picture-in-picture screen 1200 where the video display 1102 and the virtual environment 1104 are swapped such that the display of the virtual environment 1104 occupies the main screen and the video 1102 occupies. the smaller screen.

The picture-in-picture view 1200 may be complemented by small billboard icons 1202, 1204 and label 1206 (e.g. for comments) that appear in the 3D map view at the appropriate playback time. These small geolocated displays may serve as display for an upgraded text comment feature with multi-line text support.

During playback, when the current time on the timeline reaches a point where media is present, then the corresponding media icon is shown on the map and the corresponding media is shown via the picture-in-picture display (or text overlay for comments). This may be as a slideshow for photos, or as a video player for video. In the case of video, the playback of the video may be slaved to the media player time controls described with reference to FIG. 7a. The time controls 712 and 714 allow playback at very high and low speeds (e.g. 256× or 0.125×). In this case the playback speed may be automatically adjusted or even throttled to a valid video playback speed.

This media viewing experience may be on top of the current 'multi-track' viewing experience as explained with reference to FIG. 10. One example may only allow the media for the currently selected 'multi-track' user to be viewed via the picture-in-picture display. The multi-track user selection interface 1006 and 1008 in this way forms a hub for the viewer to decide whose video they are watching, or photos they are viewing.

To facilitate discovery of all the media that is present in a visualisation, another user interface element provides small thumbnails of all photos and video present for all visualised users. By selecting the appropriate thumbnail image this both selects the corresponding user, along with changing the current time on the timeline to the point where the media recording took place. The automated camera is moved to the appropriate location and the picture-in-picture display is updated with the selected media.

Figure 13:
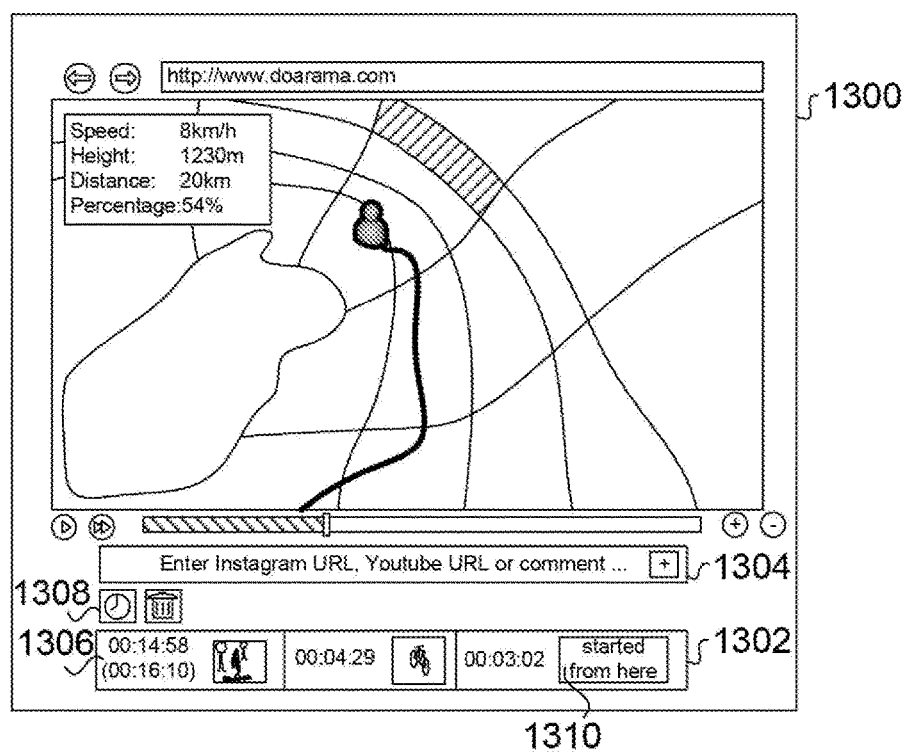
FIG. 13 shows an authoring screen.

FIG. 13 illustrates an authoring screen 1300 comprising a time line 1302, a text input field 1304, a first media element 1306 and a synchronisation button 1308. User 116 can record and upload an optionally geotagged media item, such as a video, and upload the video item onto a thud party server, such as Youtube. User 116 then obtains a URL to this video and enters this URL into the text input field 1304. Processor 102 receives the URL, detects that the URL is a You tube URL and activates the You tube API to retrieve a preview and a handle to the video stream. Processor 102 also accesses the geotagging and/or timing data associated with the video in order to determine at which position on the GPS track the video was taken. Processor 102 then places the media item at the corresponding position into time line 1302.

This way, processor 102 populates the time range of the GPS track with media by synchronising the start times of when the media was recorded to the corresponding point on the visualisation timeline.

In one example, if a media item, such as a photo or video, has a valid timestamp, processor 102 places the media item at the corresponding time on the timeline. If the media item has a valid geotag, then that location may be used. There may also be manual controls to allow fine tuning or over-riding the time and possibly position of when and where the media was recorded. In the example of FIG. 13, user 116 can move the GPS track to a particular point in time and select media item 1306. When the user 116 then clicks on the synchronisation button 1308, processor 102 offsets the timing information of the media item 1306 to match the current playback time. This way, timing offsets between the camera and the GPS receiver can be compensated by the user 116.

Third party APIs (e.g. histogram and YouTube data APIs) may be used to reduce the number of steps for a user in this process. Text comments, such as text comment 1310, can also be authored through the same user interface 1300. In this way comments, photos and videos can be treated similarly.

A computer-implemented method for generating a visualisation of a geo-located activity associated with a set of geo-positions may comprise the steps:

retrieving a sequence of geo-positions from a remote track store server;

retrieving a set of map tiles from a remote map tile server where these map tiles correspond to the geo-positions;

retrieving terrain height values from a remote terrain server where these terrain heights correspond to the geo-positions;

rendering a 3D animated visualisation showing an object tracing the path of the geo-positions through a rendered 3D representation generated using the tile maps and the terrain height values;

receiving from a user a set of customisation parameters to use for a second animated visualisation associated with the same set of geo-positions;

generating an image associated with the first animated visualisation or the second animated visualisation and the set of customisation parameters; and storing the image and the customisation parameters on a remote server for subsequently producing the second animated visualisation.

The method may comprise the additional step of posting the image and a reference to the set of customisation parameters to a social media system.

The method may comprise the additional steps of retrieving a second sequence of geo-positions from a remote track store server and including a rendering of an object tracing the path of this second sequence in the 3D animated visualization.

The method may comprise the additional previous step of searching for sequences of geo-positions on a remote track store which are co-located and contemporaneous with the first sequence of geo-positions.

The method of determination of co-location and contemporaneity may be by selecting any sequence of geo-positions for which the spatiotemporal cube of latitude, longitude and time duration overlaps the spatiotemporal cube of latitude, longitude and time duration of the first sequence of geo-positions.

It will be appreciated by persons skilled in the art that numerous variations and/or modifications may be made to the specific embodiments without departing from the scope as defined in the claims.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating", "optimizing" or "determining" or "displaying" or "maximising" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

The invention claimed is:

1. A computer implemented method for simulating movement of a tracked object in a three-dimensional virtual environment, the method comprising:

receiving position data indicative of a pre-recorded sequence of real-world geographic positions of a moving tracked object over time, each of the real-world geographic positions of the tracked object being associated with a virtual position of the tracked object within the virtual environment;

generating a first image of the virtual environment which represents a view by an observer from an initial observation position in the virtual environment in an initial viewing direction towards an initial target position in the virtual environment, the initial observation position being at a pre-determined distance from the initial target position;

as the tracked object moves away from the initial target position and from the initial observation position, iteratively updating the target position by performing the steps of calculating a first difference between a current target position and the position of the tracked object;

calculating a first velocity of the target position based on the first difference;

calculating an updated target position in the virtual environment based on the first velocity to update the viewing direction of the observer such that the updated target position is iterated from the initial target position closer to the next virtual position of the moving tracked object in the pre-recorded sequence, so as to be at a location within the virtual environment that is different to and follows at the determined first velocity the next virtual position of the tracked object in the pre-recorded sequence;

as the tracked object moves away from the initial observation position by more than the pre-determined distance, iteratively updating the observation position by performing the steps of calculating a second difference between a current observation position and a desired observation position;

calculating a second velocity of the observation position based on the second difference;

calculating an updated observation position of an observer in the virtual environment based on the second velocity such that the updated observation position of the observer is iterated closer to a desired observation position than the initial observation position wherein the desired observation position is at a pre-determined distance from the next virtual position in the pre-recorded sequence; and generating a second image of the virtual environment which represents a view by the observer from the updated observation position in the virtual environment in an updated viewing direction towards the updated target position in the virtual environment.

2. The method of claim 1, wherein determining the updated target position and determining the updated observation position comprises simulating a movement of a physical observer.

3. The method of claim 2, wherein simulating the movement comprises simulating the movement based on Verlet integration.

4. The method of claim 1, wherein determining the updated observation position comprises adjusting an azimuth angle to the updated observation position from the virtual position of the object to create a three-dimensional impression between the first image and the second image.

5. The method of claim 1, wherein the desired observation position is based on a desired viewing distance between the updated observation position and the virtual position of the object.

6. The method of claim 5, wherein the desired viewing distance is based on user input in relation to zooming the image.

7. The method of claim 1, wherein the desired observation position is based on a desired zenith angle to the updated observation position from the virtual position of the object or based on a desired altitude of the desired observation position.

8. The method of claim 7, wherein the desired zenith angle or desired altitude is based on terrain data.

9. The method of claim 8, further comprising determining the desired zenith angle or desired altitude based on terrain data such that one or more of the initial target position, the updated target position, and the virtual position of the object are visible from the observation position.

10. The method of claim 9, further comprising:
    selecting multiple terrain tiles associated with the virtual environment;
    retrieving the multiple terrain tiles from a terrain tile server;
    storing the multiple terrain tiles in a tile cache; and
    determining the terrain data from the multiple terrain tiles.

11. The method of claim 10, wherein selecting multiple terrain tiles comprises selecting the multiple terrain tiles along a line from the initial or updated observation position to the initial or updated target position.

12. The method of claim 10, wherein selecting multiple terrain tiles comprises selecting neighbours of selected terrain tiles.

13. The method of claim 10, further comprising performing the steps of selecting, retrieving, storing and determining a first time for the updated observation position and a second time for the updated target position.

14. The method of claim 1, further comprising repeating the method for a different object.

15. The method of claim 1, further comprising:
    receiving from a user a set of customisation parameters;
    generating a third image of set of the virtual environment based on the customisation parameters; and
    storing the third image and the customisation parameters on a remote server.

16. The method of claim 15, further comprising posting the third image and a reference to the set of customisation parameters to a social media system.

17. The method of claim 1, further comprising repeating the method to generate a sequence of images of the virtual environment associated with a first sequence of multiple geographic positions of the object.

18. The method of claim 17, further comprising receiving from a user interface a selection of a range of the sequence of images and storing the selection of the range to allow displaying only the selected range of the sequence of images.

19. The method of claim 17, further comprising generating a first graphical trace of the object along a first path defined by the first sequence of the multiple geographic positions of the object.

20. The method of claim 19, further comprising generating a second graphical trace of a second object along a second path defined by the second sequence of the multiple geographic positions of a second object.

21. The method of claim 17 further comprising selecting a third sequence of multiple geographic positions which are co-located and contemporaneous with the first sequence of geo-positions.

22. The method of claim 21, wherein determination of co-location and contemporaneity is by selecting any sequence of geo-positions for which a first spatiotemporal cube of latitude, longitude and time duration of the first sequence overlaps a second spatiotemporal cube of latitude, longitude and time duration of the third sequence.

23. The method of claim 1, further comprising receiving from a user interface a selection of a set of one or more visualisation parameters, wherein generating the second image is based on the set of one or more visualisation parameters.

24. The method of claim 1, further comprising receiving from a user interface text data associated with a virtual position, wherein generating the second image comprises generating the second image such that the second image comprises a label representing the text data located in the virtual environment in relation to the virtual position associated with the text data.

25. The method of claim 1, further comprising:
    receiving from a user device direction data indicative of a viewing direction of a user; and
    determining the updated direction based on the direction data.

26. The method of claim 25, wherein the direction data is indicative of an orientation of the head of the user.

27. The method of claim 1, further comprising:
    repeating the method to generate a sequence of images of the virtual environment, each image of the sequence being associated with a first geographic position or a first time value; and
    displaying in relation to one image of the sequence of images a media item that is associated with a second geographic position or a second time value, such that the first geographic position or first time value associated with the one image of the sequence of images corresponds to the second geographic position or time value associated with the media item.

28. The method of claim 1, further comprising:
    receiving input data representing a media item; and
    retrieving geographic or timing information associated with the media item,
    wherein generating the second image comprises generating a display of the media item at a position in the virtual environment which represents the geographic or timing information associated with the media item.

29. A non-transitory computer readable medium, including computer-executable instructions stored thereon that when executed by a processor, causes the processor to perform the method of claim 1.

30. A computer system for simulating movement of a tracked object in a three-dimensional virtual environment, the computer system comprising:
    an input port to receive position data indicative of a pre-recorded sequence of real-world geographic positions of a moving tracked object over time, each of the real-world geographic positions of the tracked object being associated with a virtual position of the tracked object within the virtual environment; and
    a processor to generate a first image of the virtual environment which represents a view by an observer from an initial observation position in the virtual environment in an initial viewing direction towards an initial target position in the virtual environment the initial observation position being at a pre-determined distance from the initial target position; as the tracked object moves away from the initial target position and from the initial observation position, to iteratively update the target position by performing the steps of
    calculating a first difference between a current target position and the position of the tracked object;
    calculating a first velocity of the target position based on the first difference;
    calculating an updated target position in the virtual environment based on the first velocity, to update the viewing direction of the observer such that the updated target position is iterated from the initial target position closer to the next virtual position of the moving tracked object in the pre-recorded sequence, so as to be at a location within the virtual environment that is different to and follows, at the determined velocity, the next virtual position of the tracked object in the pre-recorded sequence,
as the tracked object moves away from the initial observation position by more than the pre-determined distance, to iteratively update the observation position by performing the steps of
    calculating a second difference between a current observation position and a desired observation position;
    calculating a second velocity of the observation position based on the second difference;
calculating an updated observation position of an observer in the virtual environment based on the second velocity such that the updated observation position of the observer is iterated closer to a desired observation position than the initial observation position, wherein the desired observation position is at a pre-determined distance from the next virtual position in the pre-recorded sequence; and generate a second image of the virtual environment which represents a view by the observer from the updated observation position in the virtual environment in an updated viewing direction based on towards the updated target position in the virtual environment.

* * * * *